United States Patent [19]
Schuk et al.

[11] 3,760,829
[45] Sept. 25, 1973

[54] AUTOMATIC CONTROL SYSTEM FOR THE SAFE AND ECONOMICAL REMOVAL OF NH3 BY BREAKPOINT CHLORINATION

[75] Inventors: Walter W. Schuk, Lincolnia Heights, Alexandria; Thomas A. Pressley, Springfield, both of Va.; Dolloff F. Bishop, Camp Springs, Md.

[73] Assignee: The United States of America as represented by the Administrator of the Environmental Protection Agency, Washington, D.C.

[22] Filed: May 9, 1972

[21] Appl. No.: 251,777

[52] U.S. Cl. .................................. 137/93, 210/96
[51] Int. Cl. .................................. G05d 11/08
[58] Field of Search ............... 137/3, 93; 210/96

[56] References Cited
UNITED STATES PATENTS
3,528,545 9/1970 Frazel et al. .................. 210/96

Primary Examiner—Robert G. Nilson
Attorney—Alvin Browdy et al.

[57] ABSTRACT

An automatic system for controlling the chlorine feed in the breakpoint chlorination process at the optimum dose level, under the conditions of varying ammonia concentration and process flow rates as well as other fluctuations in process chlorine demand. The function of the automatic breakpoint controller is described by the equation:

$$(A \cdot B \cdot C) D = E$$

where A is the process flow rate, B is the $NH_3$—N concentration, C is the preselected Cl:$NH_3$—N weight ratio, D is an error signal which is a function of the predetermined free chlorine residual and the measured free chlorine residual and E is the total chlorine dose.

5 Claims, 4 Drawing Figures

▷ PNEUMATIC RELAY
◇ 20 PSIG INSTRUMENT AIR SUPPLY
⊙ DIVERTING VALVE

AUTOMATIC CONTROL SYSTEM FOR THE SAFE AND ECONOMICAL REMOVAL OF NH3 BY BREAKPOINT CHLORINATION

FIELD OF INVENTION

The present invention relates to an automatic control system particularly useful in connection with the process of nitrogen removal from wastewaters by breakpoint chlorination taught in copending application Ser. No. 175,902 filed Aug. 20, 1971, the subject matter of which is hereby incorporated by reference. More particularly, the present invention relates to the automatic control of the breakpoint chlorination reaction for removing ammonia from wastewaters on an industrial scale to provide an economical operation favoring the optimum yield of nitrogen and the optimum dosage of chlorine.

BACKGROUND OF THE INVENTION

Breakpoint chlorination, as practiced for many years in the water treatment industry, provides a physical-chemical means for removing ammonia from wastewaters. This procedure has been widely studied at $NH_3$—$N$ concentrations usually below 1 mg/l; in such dilute waters, chlorine reacts with the ammonia to form various chloramines 1. $Cl_2 + H_2O \longrightarrow HOCl + HCl$
2. $NH_4^+ + HOCl \longrightarrow NH_2Cl + H_2O + H^+$
3. $NH_2Cl + HOCl \longrightarrow NHCl_2 + H_2O$
4. $NHCl_2 + HOCl \longrightarrow NCl_3 + H_2O$ Chlorine is added to process waters until a point is reached where the total dissolved residual chlorine has reached a minimum (the breakpoint) and the $NH_3$—$N$ has disappeared.

In water at $NH_3$—$N$ concentrations of less than 1 mg/l, and before the breakpoint, the type of chloramine formed depends upon the pH. Spectrophotometric analyses had indicated that the chief constituent is monchloramine in the pH range of 7–8.5. As the pH decreases below 7, increasing amounts of dichloramine appear. In the pH range of 4.5–5.0, dichloramine is the chief product; below pH 4, nitrogen trichloride is the chief product.

Breakpoint chlorination studies on buffered synthetic ammonia samples at pH 7.0 had revealed that monochloramine concentration reaches a maximum at the 5:1 weight ratio of $Cl:NH_3$—$N$. As the weight ratio of $Cl:NH_3$—$N$ exceeds 5:1, the monochloramine breaks down to form dichloramine and ammonia (equation 5).

5. $2NH_2Cl \longrightarrow NHCl_2 + NH_3$

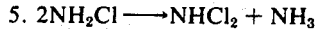

The dichloramine reaches a maximum concentration at the $Cl:NH_3$—$N$ weight ratio of about 7.5:1.

The prior art had also indicated that in water with less than 1 mg/b 1 of $NH_3$—$N$, the reaction proceeds in competition with monochloramine formation (equation 2) until the chlorine dosage reaches the breakpoint at between the 9:1 and 10:1 weight ratio of $Cl:NH_3$—$N$. Other studies, however, had indicated that monochloramine is oxidized by excess chlorine under slightly alkaline conditions to nitrogen gas (equation 6).

6. $2NH_2Cl + HOCl \longrightarrow N_2 + 3HCl + H_2O$

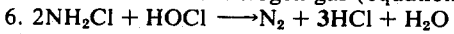

Stoichiometrically, the ammonia oxidation through monochloramine to $N_2$ corresponds to a 7.6:1 weight ratio of $Cl:NH_3$—$N$. The prior art had also suggested the occurrence of other end-products, including nitrate and nitrogen trichloride. In fact, the nitrogen trichloride produced (equation 4) in water treatment plants during breakpoint chlorination has been indicated to be a serious problem.

In wastewaters, the $NH_3$—$N$ concentration may be more than an order of magnitude higher than those normally encountered in natural waters. Thus, in wastewater treatment, where ammonia concentrations usually lie between 15 and 20 mg/l., the cost of large quantities of chlorine needed to reach breakpoint has generally inhibited series consideration of the process. However, the major problem, which has in the past inhibited the commercial utilization of breakpoint chlorination to wastewaters, has been the production of $NCl_3$; regardless of the quantity of chlorine feed, it has previously not been possible to prevent $NCl_3$ formation (due to HCl production causing reduced pH which favors $NCl_3$) with the results of not achieving the desired breakpoint and additionally producing the highly dangerous poisonous substance $NCl_3$.

The problems and defects in the prior art attempts at breakpoint chlorination have been overcome by the process of the previously mentioned co-pending application Ser. No. 175,902 in which the pH and chlorine dosage are carefully controlled during the breakpoint chlorination reaction. In addition, the chlorine fed to the wastewater is thoroughly and quickly mixed therewith. With this process, nitrogen can be formed with minimum byproduct formation providing a highly reliable method for ammonia removal from wastewaters at a minimum chlorine cost. Furthermore, the free chlorine residual after breakpoint is a much more effective disinfectant than the chloramines that are produced in situ by normal disinfection procedures using small amounts of chlorine.

Previous work in the control of breakpoint chlorination involved only the control of chlorine feed to obtain a manually determined free chlorine residual. There are many disadvantages to these prior art processes. Larger chlorine dosages are required to achieve breakpoint. This is an economically important disadvantage since chlorine is relatively expensive. Overdose of chlorine can occur thus increasing the formation of undesirable nitrogen trichloride. Furthermore, underdose of chlorine can occur which will not produce a successful breakpoint. No previous method has provided an automatic response in chlorine dosage to changes in ammonia concentration, pH of influent, or process flow rate. No satisfactory prior art method has provided a means for showing when a free chlorine residual is obtained, in contrast to total residual chlorine. In particular, the prior art processes have been unable to manually control the breakpoint process under conditions of fluctuating ammonia concentrations, process flow and process pH.

SUMMARY

It is, accordingly, an object of the present invention to overcome the defects of the prior art, such as indicated above.

It is another object to automatically optimize the breakpoint chlorination reaction in the face of varying quantities and flows of wastewaters, and varying pH and concentrations of ammonia in such wastewaters.

It is a further object to automatically control and reduce alkalinity in combination with automatic control of breakpoint process.

It is still another object to provide for the integration of multiple analyses to provide a single signal which is in direct proportion to the amount of chlorine required for the complete removal of ammonia by breakpoint chlorination.

These and other objects and the nature and advantages of the instant invention will be better understood with reference to the attached drawing.

DETAILED DESCRIPTION

Figure 1:
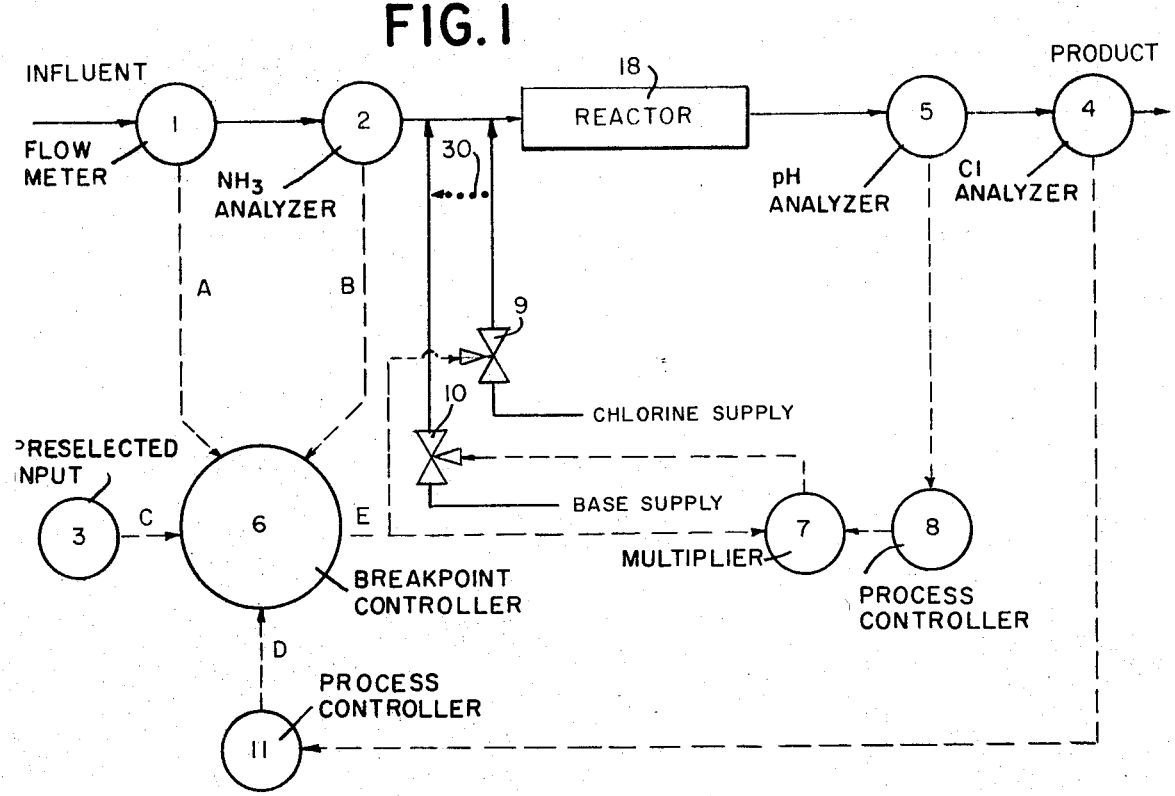
FIG. 1 is a flow diagram showing one embodiment of the present invention.

To use breakpoint chlorination for nitrogen removal at the $NH_3-N$ concentrations encountered in wastewaters, the end products of the reaction need to be known. The major products of the breakpoint reaction in wastewaters can be identified and the formation and behavior of the nuisance residuals of $NCl_3$ and $NO_3^-$ as a function of pH, chlorine dosage, and temperature can be determined.

Ammonia removal by breakpoint chlorination proceeds according to the overall reaction:

7. $3Cl_2 + 2NH_3 \longrightarrow N_2 + 6HCl$

The series of steps to oxidize the ammonia to nitrogen gas are:

1. $Cl_2 + H_2O \longrightarrow HOCl + HCl$ 2. $NH_4 + HOCl \longrightarrow NH_2Cl + H_2O + H^+$ 6. $2NH_2Cl + HOCl \longrightarrow N_2 + 3HCl + H_2O$ The "breakpoint" is defined as the point where the $NH_3 - N$ is reduced to zero, free available chlorine is detected and the total residual chlorine is minimized. The following undesirable side reactions may also occur.

3. $NH_2Cl + HOCl \longrightarrow NHCl_2 + H_2O$
4. $NHCl_2 + HOCl \longrightarrow NCl_3 + H_2O$
8. $NH_4^+ + 4Cl_2 + 4H_2O \longrightarrow HNO_3 + H_2O + 8HCl + H^+$ The reaction conditions must be intentionally manipulated to favor Equation (6) and minimize the products of Equations (3), (4) and (8). The successful control of these reactions makes possible the conversion of relatively large amounts of ammonia present in wastewaters to harmless nitrogen gas, with minimum formation of undesirable byproducts. Thus, the natural biological nitrogen cycle (ammonia conversion to nitrogen) is simulated chemically and at minimum chlorine dose.

To favor reaction (6) the pH should be controlled to maintain at all times, and at all locations in the reation vessel, a pH between 5.8 and 9.5 and preferably in the range of 6 to 8. At pH 6 – 8 the reaction proceeds fastest with the least quantities of chlorine and base; below pH 5.8 undesirably high amounts of $NCl_3$ are produced and there is a high chlorine demand, while at pH above about 9.5 other undesirable side reactions occur. However, because of acid production during the chlorine hydrolysis (reaction 1) the pH of the influent may exceed 9.5.

In addition to pH control, the chlorine dosage must be carefully maintained, to minimize $NCl_3$ and chloramine formation, within the range of 8 to 10 parts of chlorine per part of $NH_3-N$ for most municipal wastewaters. To maintain the desired ratio of reactants and the desired pH value, at all locations within the reactor zone, it is essential to provide adequate mixing of the introduced chlorine with the wastewater.

When the influent wastewater is raw, untreated wastewater, the ratio of chlorine feed to $NH_3-N$ content should normally be about 10:1. When the influence wastewater is highly treated, such as line clarified and filtered secondary effluent, about 8 parts per weight of chlorine are usually needed per part of $NH_3-N$. Since wastewater may contain from less than 8 to more than 30 mg./l., but will generally contain 15–20 mg/l. of ammonia, it is seen that the quantity of chlorine necessary to remove the ammonia may lie between 64 and 300 mg/l. but will generally lie between 120 and 200 mg/l. of chlorine, and more normally between 120 – 170 mg/l. of chlorine.

The amount of chlorine required for breakpoint depends upon the ammonia and non-ammonia chlorine demand and the amount of residual free chlorine desired in the wastewater. In general, as the degree of wastewater treatment before the breakpoint process increases, the amount of non-ammonia chlorine demand decreases and the chlorine requirement approaches the theoretical 7.6:1 weight ratio of Cl to $NH_3-N$ of Equation 7. For example: a 10:1 $Cl:NH_3-N$ weight ratio may be required to breakpoint raw wastewater, and approximately an 8:1 ratio may be needed for lime clarified and filtered secondary effluent.

The inlet ammonia concentration and wastewater flow will vary with time. The chlorine dosage must be set and controlled in proportion to the ammonia feed. With too low a chlorine dosage, the reaction will not go to completion and chloramines will be the end product. Nitrogen trichloride will be formed if more than a little excess chlorine (beyond that needed for breakpoint) is added to the system.

The automatic breakpoint controller of the present invention establishes an approximate chlorine dosage for breakpoint chlorination of ammonia and modifies the approximate chlorine dosage to the optimum chlorine dosage required for complete removal of ammonia by breakpoint chlorination from a specific wastewater. The function of the breakpoint controller is described by the following equation:

9. $(A \cdot B \cdot C) D = E$ where:
A = Process flow in liters per minute
B = Ammonia - Nitrogen concentration (mg/l)
C = Preselected $Cl:NH_3 - N$ weight ratio
D = Error signal
E = Total chlorine dosage in grams/min.

As is shown in FIG. 1, process flow (A) is measured by a flow meter 1. A continuous measurement of the ammonia concentration (B) in the influent stream is made by an automatic analyzer 2. This automatic analyzer may operate by a colorimetric system although a specific ion continuous electrode probe type system would be preferable. The two signals A and B (flow and ammonia concentration) are multiplied together by the breakpoint controller 6 to determine the mass of ammonia present. The mass signal (A·B) developed is then multiplied by a manually preselected $Cl:NH_3-N$ weight ratio (C) by the breakpoint controller 6 to establish an approximate chlorine requirement (A·B·C) to achieve breakpoint chlorination. The preselected value C is fed to the breakpoint controller 6 from an input 3. The preselected value (C) corresponding to the $Cl:NH_3-N$ weight ratio required for the ammonia oxidation to $N_2$ has a theoretical value of 7.6:1. The selected value depends upon the wastewater and usually varies from 8 – 10:1.

The error signal D is generated to correct for errors in chlorine demand as represented by A·B· C and to allow a certain desirable free chlorine residual. The free chlorine concentration in the process effluent is measured by an automatic analyzer 4 and is compared to a predetermined desired free $Cl_2$ residual by a standard process controller 11. Such controllers are well known in the art and may be, for example, a Robertshaw Process Controller 323–Al–Al. The error signal D thus developed from the free chlorine residual is used by the breakpoint controller 6 as a feedback loop to modify the chlorine requirement established by the mass signal A·B·C to the optimum chlorine dosage F required to achieve complete ammonia removal and the desired predetermined free chlorine residual. A valve 9 controlled by the breakpoint controller 6 will then permit the calculated quantity of chlorine to enter the stream just upstream of reactor 18.

Careful pH control is necessary to prevent the formation of noxious by-products and to stablize the process pH for efficient breakpoint operation. Control of pH is achieved by the proper addition of a base to neutralize the acid formed by addition of chlorine to the process (Equation 7). The pH is maintained by means of a multiplier 7 which permits the addition of base in an amount proportionate to the chlorine dosage as determined by the breakpoint controller 6. A standard process controller 8 feeds an error signal into the multiplier 7 which modifies the base dosage or a function of the process pH as measured by continuous pH analyzer 5 and the preselected optimum pH. The output of the multiplier 7 permits the valve 10 to admit the precise amount of base necessary for proper pH control. This system prevents upsets in process pH caused by changes in chlorine dosages (E) and changes in pH caused by fluctuations in the buffer capacity of the waste-water. The base such as NaOH or $Ca(OH)_2$, is preferably added upstream of the chlorine addition. Alternatively, the chlorine may be mixed with the base prior to addition to the stream as shown at 30.

In an alternate embodiment of the present invention, the alkalinity of the influent wastewater is utilized to neutralize the acid formed by the addition of chlorine, reducing both base requirements for pH control and effluent wastewater alkalinity. The effect is achieved by predosing with chlorine to a manually selected pH level.

Figure 2:
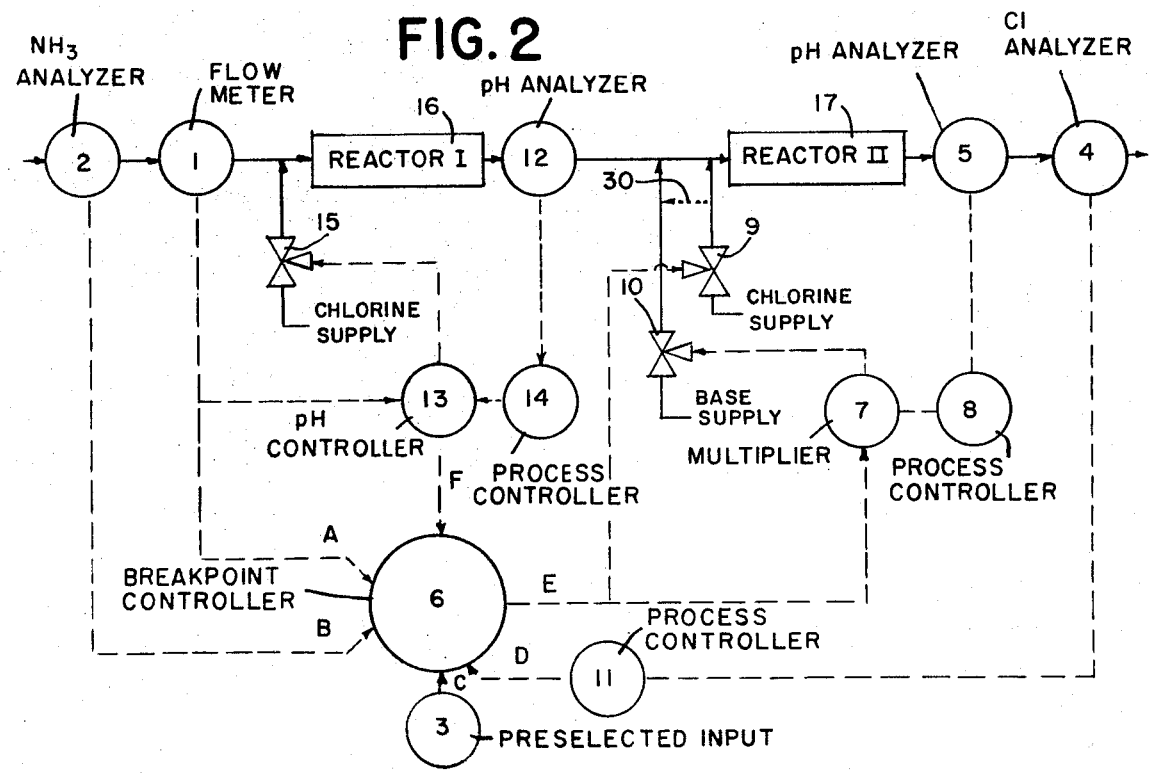
FIG. 2 is a flow diagram of a second embodiment of the present invention.

The breakpoint controller 6, as may be seen in FIG. 2 establishes a theoretical chlorine dosage for breakpoint chlorination of ammonia, as described in the first specific embodiment above, subtracts the chlorine predose utilized for pH adjustment (if any) and modifies the approximate chlorine dosage to the optimum dosage required for complete removal of ammonia by breakpoint chlorination of a specific wastewater by means of an error signal. The function of this alkalinity-breakpoint controller is described by the following equation:

11. $[(A·B·C) - F] D = E$ where:

A = Process flow rate (l/min)
B = $NH_3-N$ concentration (mg/l)
C = Preselected $Cl:NH_3-N$ weight ratio
D = Error signal
E = Total chlorine dosage (g/min)
F = Chlorine predose (g/min)

The chlorine predose F is a function of the pH and the buffer capacity of the particular wastewater influent. An approximate predose is either calculated for a specific wastewater or determined empirically. A flow proportioned pH controller 13 permits the addition of chlorine as a function of this predetermined value and the process flow rate as determined by flow meter 1. This dosage is modified by a standard process controller 14, similar to the process controller 8 described above. Process controller 14 generates an error signal which is a function of the process pH at the effluent side of the predosing reactor 16 and the preselected desired pH. The amount of chlorine predose (F) as determined by the pH controller 13 is admitted by valve 15 into the process line just upstream of reactor 16. The amount of predose is also continuously fed into breakpoint controller 6 and subtracted from the value of A·B·C. The resulting (A·B·C)-F signal is then modified by the error signal D in the same manner described in the description of FIG. 1. The output of breakpoint controller 6 represents the remaining amount of chlorine to be added to reactor 18 in order to complete the removal of ammonia by breakpoint chlorination and leave a predetermined free chlorine residual.

Figure 3:
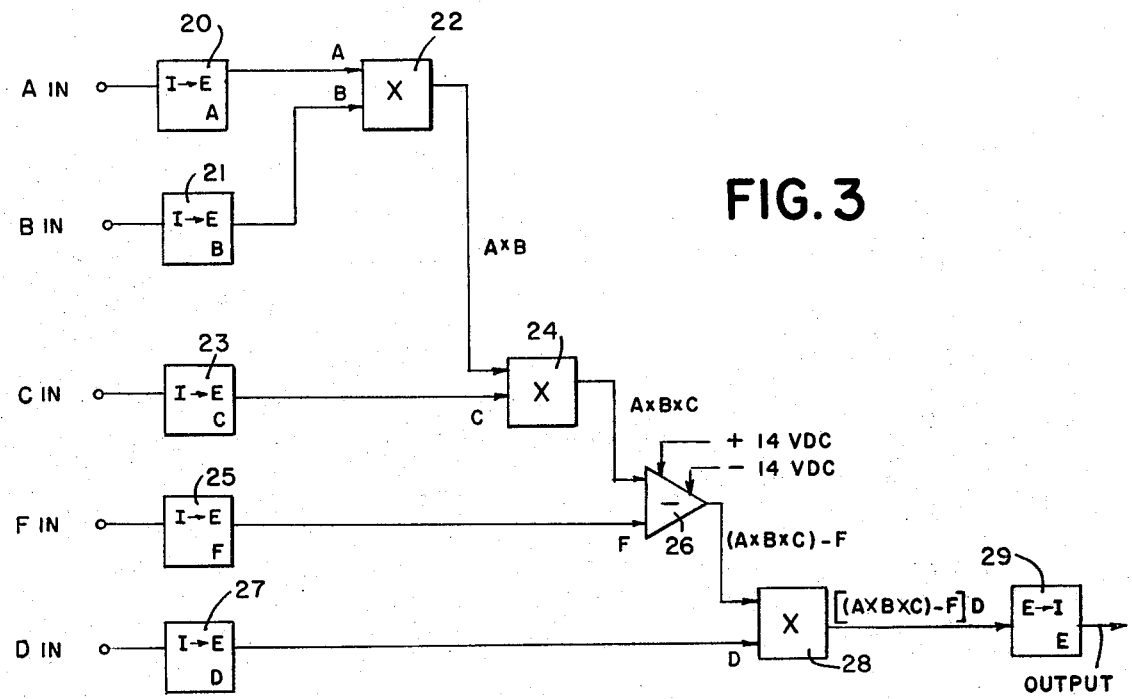
FIG. 3 is an electronic block diagram showing the function of the breakpoint controller.

FIG. 3 shows the function of the breakpoint controller in an electronic mode. It is basically a series of multiplying function generators with one subtraction function generator. The operations can be performed by either analog or digital equipment. The breakpoint controller receives signal A from the flow meter and signal B from the ammonia analyzer and converts the current to voltage at 20 and 21. The signals are then fed to a standard operational amplifier 22 and multiplier together. The preselected factor C corresponding to the $Cl:NH_3-N$ weight ratio required to oxidize ammonia to $N_2$ is then fed into the controller and the current is converted to voltage at 23. This signal is then multiplied by the product of A·B from function generator 22 in function generator 24. The product A·B·C from function generator 24 is then fed into function generator 26 and the chlorine predose F which has been converted to voltage at 25 is subtracted therefrom. In the first embodiment, illustrated in FIG. 1, the value of F will be zero. The signal corresponding to (A·B·C)-F from function generator 26 is then fed to function generator 28 and multiplied by the error signal D after it is converted to voltage at 27. The final value [(A·B·C)-F]D, which is equal to E, is then converted back from voltage to current at 29 and fed to the chlorine supply valve 9 and the multiplier 7. Each of the operational amplifiers amy be operated at 0 – 100 percent to correspond the signals to any desired proportion.

Figure 4:
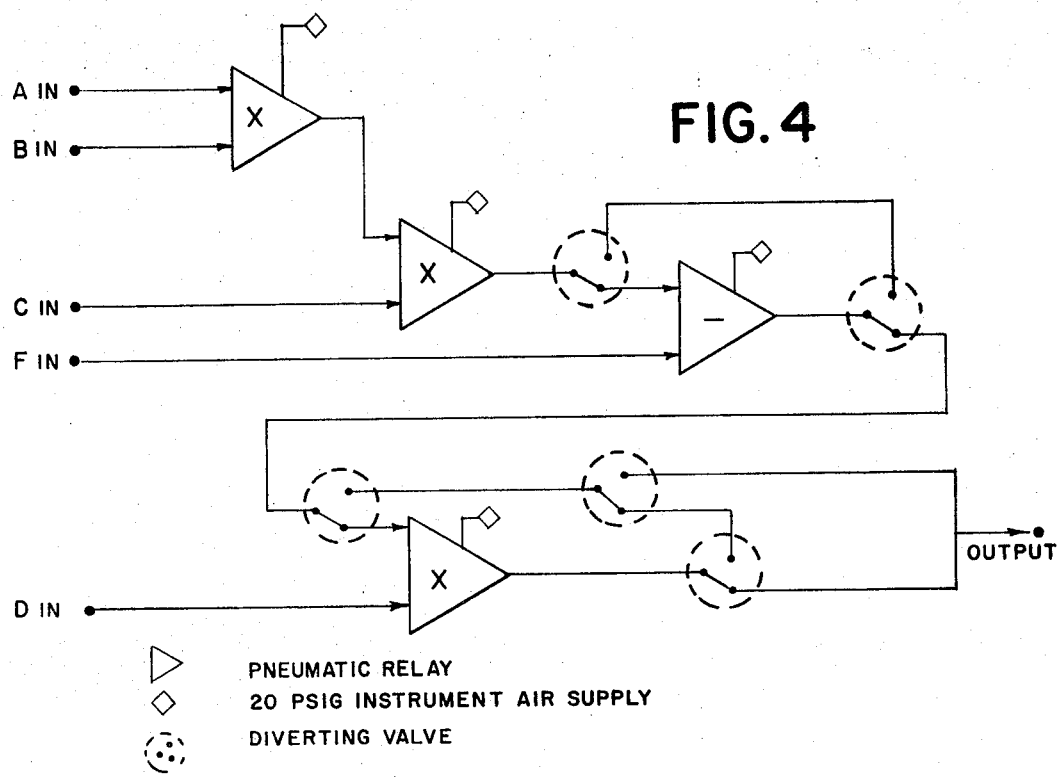
FIG. 4 is an pneumatic block diagram of breakpoint controller in the pneumatic mode.

The breakpoint controller functions may just as easily be performed in a pneumatic mode as illustrated in FIG. 4. This mode is essentially the same as the electronic mode of FIG. 3 except the input signals are converted to pneumatic pressure as opposed to EMF and the function generators are all of the known pneumatic type as opposed to electronic. It should be noted that all signals in the mode depicted in FIG. 4 are 3 – 15 psig. linear. The function of each pneumatic relay is indicated by the mathematical symbol therein.

In operation the signal from the product A·B·C only is used to control the chlorine feed during start-up until a free chlorine residual is sensed by the analyzer 4. As long as a free chlorine residual is not sensed, the Cl:NH$_3$—N weight ratio C must be manually increased until a free chlorine residual is obtained. When a free chlorine residual signal is sensed, an error signal D is generated by the process controller 11 on the basis of a comparison between the measured free chlorine and the predetermined optimum free chlorine. This input is then fed into the operation.

After a free chlorine residual has been obtained and the appropriate Cl:NH$_3$—N weight ratio selected (for the specific wastewater), the fluctuations in the flow or influent ammonia concentrations will automatically cause a corresponding change in the chlorine dosage computed by the A·B·C signal. Fluctuations in the process chlorine demand other than flow or ammonia fluctuations (i.e., organic chlorine demand) will cause a corresponding change in the chlorine dosage computed by the error signal D to maintain a selected free chlorine residual.

Examples of specific instruments which may be used in the present invention are given below. It should be understood, however, that these are only given by way of example and are not meant to be limitative in any way. Those of ordinary skill in the art know what instruments or circuitry will perform the functions called for in the present invention. The numbers correspond to those of FIGS. 1 and 2:

1. Magnetic Flow Meter (Brooks Model 7100/7200).
2. Technicon Auto Analyzer NH$_3$ w/Transmations Inc. Pot/I No.354T Output Generator
3. Robertshaw Manual Set Station No.510-Al
4. Technicon Auto Analyzer Free Cl$_2$ w/Transmations Inc. Pot/I Output Generator
5. Universal Interloc pH Flow Cell
6. Analog Computer (As described in FIG. 3 and 4)
7. Sorteberg Multiplying Relay Model No.M
8. Robertshaw Process Controller 323–Al-Al
9. Wallace and Tiernan V-Notch Chlorinator w/electric plug positioner
10. Milton Roy Positive Displacement Pump w/pneumatic positioner
11. Robertshaw Process Controller No.323–Al-Al
12. Same as No.5
13. Same as No.7
14. Same as No.8
15. Same as No.9

It should be understood that the functions of the breakpoint controller 6, pH controller 8 and multiplier 7 in the first embodiment as well as the process controller 14 and flow proportioned pH controller 13 in the second embodiment may all be combined in a properly programmed digital or analog computer being continuously fed the flow rate, ammonia-nitrogen concentration, effluent pH and effluent free chlorine concentration.

It will further be obvious to those skilled in the art that various changes may be made without departing from the scope of the invention and the invention is not to be considered limited to what is described in the specification.

What is claimed is:

1. In an apparatus for removing bound nitrogen from wastewater by adding chlorine to an influent stream of wastewater in the precise amount necessary to provide complete breakpoint chlorination plus a predetermined amount of free chlorine in the wastewater effluent, and thoroughly mixing said influent and said chlorine, under conditions of controlled pH comprising a wastewater influent line, a chlorine influent line, a base influent line, a mixer-reactor and an effluent line, the improvement comprising an automatic system for controlling the amount of reagents added, said automatic system comprising:

flowmeter means connected to said wastewater influent line for determining the flow rate of wastewater influent and providing an output signal corresponding thereto;

ammonia-nitrogen analyzer means connected to said wastewater influent line for determining the concentration of ammonia-nitrogen in the wastewater influent and providing an output signal corresponding thereto;

free chlorine analyzer means connected to said effluent line for determining the concentration of free chlorine in said effluent and providing an output signal corresponding thereto;

chlorine error signal generating means connected to the output of said free chlorine analyzer means for comparing the measured free chlorine in the effluent with the predetermined optimum amount of free chlorine in the effluent and generating a chlorine error signal corresponding to the error therebetween;

breakpoint control means connected to the output of said flow meter means, said ammonia-nitrogen analyzer means and said chlorine error signal generating means for determining the precise amount of chlorine to be added to the wastewater to achieve breakpoint chlorination plus a predetermined amount of free chlorine in the wastewater effluent as a function of the flow rate of wastewater influent and the concentration of ammonia-nitrogen in the wastewater influent, as well as the predetermined Cl:NH$_3$—N weight ratio, as corrected by the chlorine error signal, and providing an output signal corresponding thereto; and chlorine control means connected to said chlorine influent line and connected to the output of said breakpoint control means for adding chlorine to said mixer-reactor in an amount controlled by the output signal from said breakpoint control means.

2. In an apparatus in accordance with claim 1, the improvement further including:

pH analyzer means connected to said effluent line for determining the pH of said effluent and providing an output signal corresponding thereto;

pH error signal generating means connected to the output of said pH analyzer means for comparing the measured pH of the effluent with the predetermined optimum pH in the effluent and generating a pH error signal corresponding to the error therebetween;

pH controller means connected to the output of said pH error signal generating means and said breakpoint control means for determining the precise amount of base to be added to the wastewater to achieve a predetermined optimum process pH as a function of the amount of chlorine being added by said chlorine control means and said pH error signal, and providing an output signal corresponding thereto; and base control means connected to said base influent line and connected to the output of said pH controller means for causing base to be added to said mixer-reactor in an amount proportionate to the output signal from said pH controller means.

3. In an apparatus in accordance with claim 1, further comprising a second mixer-reactor in said wastewater influent line before said mixer-reactor, and a chlorine predose line entering into said second mixer-reactor for neutralizing the alkalinity of the wastewater influent, said improvement further comprising:

predose control means connected to said chlorine predose line and to said breakpoint control means for controlling the amount of chlorine added to said second mixer reactor and generating a signal corresponding thereto; and wherein said breakpoint controller means further functions to subtract the amount of chlorine dispensed by said predose control means from the determined chlorine amount prior to said correction by the chlorine error signal.

4. In an apparatus in accordance with claim 1 wherein said breakpoint controller means functions electronically.

5. In an apparatus in accordance with claim 1 wherein said breakpoint control means functions pneumatically.

* * * * *